United States Patent [19]

Howard

[11] 4,410,193
[45] Oct. 18, 1983

[54] REMOTELY ADJUSTABLE COMPENSATOR FOR CENTERING STEERING SYSTEMS

[76] Inventor: Durrell U. Howard, 306 Krameria Dr., San Antonio, Tex. 78213

[21] Appl. No.: 93,968

[22] Filed: Nov. 14, 1979

[51] Int. Cl.³ .......................................... B62D 5/10
[52] U.S. Cl. ...................... 280/90; 60/415; 74/388 PS; 91/368; 114/150; 180/132; 280/94; 280/268
[58] Field of Search .............. 280/89, 94, 771, 80 R, 280/90; 180/213, 79, 141, 142, 143; 91/5, 390; 92/134, 65, 131; 60/415, 417

[56] References Cited

U.S. PATENT DOCUMENTS

| | | |
|---|---|---|
| 962,257 | 6/1910 | Rockwell ........................ 92/131 |
| 1,745,117 | 1/1930 | Plank .......................... 280/94 X |
| 2,657,535 | 11/1953 | Leuy .......................... 114/150 X |
| 2,690,916 | 10/1954 | Gilliam ........................ 280/94 X |
| 3,111,103 | 11/1963 | Bennett ........................ 114/285 |
| 3,171,298 | 3/1965 | Biabaud ........................ 180/143 |
| 3,183,992 | 5/1965 | Brueder ........................ 280/94 X |
| 3,373,631 | 3/1968 | Biabaud ........................ 280/94 |
| 3,426,612 | 1/1969 | Biabaud ........................ 280/94 X |
| 3,583,515 | 6/1971 | Schwenk ........................ 280/94 X |
| 3,628,487 | 12/1971 | Bennett ........................ 114/287 |
| 3,636,794 | 1/1972 | Wicklin ........................ 280/94 |
| 3,695,204 | 10/1972 | Bennett ........................ 114/286 |
| 3,848,885 | 11/1974 | Hefren ........................ 280/94 |
| 3,882,954 | 5/1975 | Inoue .......................... 280/94 X |
| 3,958,656 | 3/1976 | Niemann ........................ 180/79.1 |
| 3,996,742 | 12/1976 | Goff ........................... 60/484 |
| 4,051,766 | 10/1977 | Strauff ........................ 180/132 X |
| 4,079,805 | 3/1978 | Rau ............................ 180/132 |

FOREIGN PATENT DOCUMENTS

| | | | |
|---|---|---|---|
| 908012 | 8/1972 | Canada ........................... | 280/94 |
| 928934 | 6/1955 | Fed. Rep. of Germany ........ | 280/94 |
| 1047286 | 7/1953 | France ........................... | 280/94 |
| 300453 | 9/1932 | Italy ............................. | 280/94 |
| 354137 | 8/1931 | United Kingdom . | |
| 798110 | 7/1958 | United Kingdom . | |
| 1132497 | 11/1968 | United Kingdom . | |
| 1237020 | 6/1971 | United Kingdom . | |
| 1443676 | 7/1976 | United Kingdom . | |
| 1490876 | 11/1977 | United Kingdom . | |

*Primary Examiner*—Joseph F. Peters, Jr.
*Assistant Examiner*—Mitchell J. Hill
*Attorney, Agent, or Firm*—Pollock, Vande Sande & Priddy

[57] ABSTRACT

A compensator is disclosed for centering a frame supported steerable member comprising part of the steering system for a vehicle. The compensator is connected between the frame and the steering system and comprises a cylinder containing a pair of pistons and an actuator for engaging the pistons in response to movement of the steerable member. A fluid system provides fluid resistance to off-center piston movement and fluid force for return piston movement and includes components for independently varying both the resistance and the return force. The compensator may include a trimming apparatus for remotely varying the center position of the steerable member and components for controlling the rate of both turning and return movements. Optional valves may provide for deactivating the compensator manually or in response to power steering system failure, overpressurization, or vehicle speed.

85 Claims, 6 Drawing Figures

REMOTELY ADJUSTABLE COMPENSATOR FOR CENTERING STEERING SYSTEMS

TECHNICAL FIELD

This invention relates to vehicle steering systems and more particularly to a compensating device for keeping such systems in their center position in the absence of intentional steering inputs for turning the vehicle from its straight-ahead path. The invention is especially useful as a centering device for power steering systems on highway vehicles, such as automobiles and trucks.

BACKGROUND ART

Steering systems for highway vehicles and the like are designed primarily for driver control. In these systems, the steering force required on the steering member and the ratio between steering member movement and movement of the steerable ground wheel takes into consideration the characteristics of the particular vehicle and the conditions under which it will usually be operated. A wide variety of forces can act on vehicle steering systems and these must be dealt with satisfactorily in order to provide a stable and controllable vehicle. As vehicle speed increases, the effects of any adverse steering inputs are multiplied, making it necessary for the driver to exercise more precise and careful driving control.

Vehicles with stable steering systems track relatively straight ahead and generally resist all steering inputs away from center, including those of the driver. Intentional turning maneuvers by the driver therefore require sufficient turning force to overcome this positive resistance to movement away from center. When the driver relaxes the turning force applied to the steering wheel, a stable system has a strong tendency to return to its straight ahead position and normally does not overshoot the neutral or center position. By contrast, an unstable steering system provides relatively weak or no positive return to center and may overshoot and sometimes oscillate about the center position. Therefore, with an unstable system, a straight, unswerving vehicle track can be maintained only by constant driver control through precision steering inputs to the steering system. The amount of driver attention required to keep the less stable vehicle tracking straight may vary considerably because forces of many different magnitudes and types can produce spurious steering inputs into the vehicle steering system.

Some examples of less stable steering systems include standard highway-type vehicles with little or no positive caster or overpowered steering systems and various types of motor vehicles using offset wheels and/or oversized tires. Overpowered steering systems override any return or centering forces so strongly that driver feel for the center position is virtually eliminated. Zero or negative caster deprives the steering system of the centering forces discussed below with regard to positive caster. The destabilizing effects of offset wheels and/or oversized tires involve a more complex interaction of forces. Offset wheels are offset from the pivotal wheel mounting at the kingpin and can produce turning moments about the kingpin. Road forces acting along the outer portions of the extrawide tread of oversized tires can also generate turning moments about the kingpin. These turning moments can lead to instability by dramatically multiplying any force tending to turn the steerable wheels away from center. Furthermore, offset wheels sometimes have a tentency to turn away from center without driver input, a tendency which can be aggravated by either positive or negative wheel caster. Since these destabilizing forces are magnified by speed, vehicle steering with offset wheels can be extremely difficult and actually unsafe at highway speeds.

The ideal situation is one where the steering system inherently causes the vehicle to travel in an unswerving straight line unless the driver intentionally turns the vehicle in another direction. Thus, stable steering systems require relatively little attention from the driver as the vehicle progresses along a straight path down the roadway. In other words, from a steering standpoint, the stable vehicle should not respond to anything but the driver's steering commands and those commands must be of sufficient magnitude to overcome the resistance to turning away from center. In the absence of a steering input by the driver, the vehicle should literally do nothing but progress straight ahead.

In the past, vehicles that were inherently stable usually employed a generous positive caster, among other things, to achieve straight or true track characteristics. While positive caster is desirable in some respects, it is not without compromise over the full steering spectrum. For example, the adverse effects of strong, gusty crosswinds are usually more pronounced on vehicles with positive caster. As its name would imply, the vehicle tends to caster toward the side it is being pushed by the wind. Similarly, a high crown at the center of the roadway will cause such vehicles to caster toward the edge of the roadway, that is, in the downhill direction from the crown. These two adverse effects are the main negative features of achieving steering stability through generous amounts of positive caster. On the plus side, except under the foregoing conditions or where offset wheels are used, motor vehicles with positive caster are less fatiguing to drive over long distances and are safer and more controllable at highway speeds. One reason such vehicles are more controllable is that by tracking straight, virtually no driver effort is required to keep the vehicle from swerving unless the foregoing extraneous forces are present. In marked contrast, weak or soft centering systems, such as those employing little or no positive caster, excessive power steering, and/or offset wheels, change direction almost continuously so that constant driver manipulation is required for straight tracking of the vehicle. This kind of steering uses up more of the driver's energy than is generally realized and makes a long drive much more fatiguing. Unstable systems are also very susceptible to unintentional driver steering inputs such as unstable driver-induced oscillations. Single car accidents have been caused by such adverse driver inputs simply because the overly soft directional stability of the vehicle was not sufficient to resist an upset steering input initiated unintentionally by the driver.

Centering devices of the prior art have been used primarily on specialty vehicles as illustrated by the Quayle U.S. Pat. No. 3,056,461 of Oct. 2, 1962, and the Schwenk U.S. Pat. No. 3,583,515 of June 8, 1971. Quayle shows a power steering mechanism for an industrial truck in which a double-acting spring assembly returns a traction wheel to its straightforward position upon removal of fluid pressure from a hydraulic steering ram. Schwenk shows a double-acting air pressure assembly for returning a steering axle to its center position upon removal of forces serving to rotate the axle away from center. In these devices, the resistance to movement away from center is substantially equal to the return force to center. The two devices are also quite similar in that both bias two piston components away from each other against respective stops near each end of a cylinder component. Thus, the spring of Quayle and the pressure chamber of Schwenk are both located between the piston components. The center position of these prior art devices is fixed at the time of installation.

Bishop U.S. Pat. No. 3,333,863 of Aug. 1, 1967, is of interest as showing a wheel stabilizer with a spring arrangement for counteracting torque around the kingpin due to the vehicle weight. The spring of FIG. 3 includes hydraulic dampening. However, the spring arrangement is single-acting only and the device is not employed as a centering mechanism.

DISCLOSURE OF THE INVENTION

Considerable road testing of various prototypes of centering compensators embodying one or more concepts of the present invention has shown that in order to properly compensate for the various steering forces encountered and to otherwise aid the driver in controlling the direction of the vehicle, a centering compensator should have the following features:

(a) A static return force toward the center position at all positions on either side of center, the amount of return force being sufficiently large to override spurious steering inputs tending to cause turning movements away from center.

(b) A static resistance to turning movement away from the center position at all positions on either side of center, the amount of static resistance being larger than the amount of static return force but sufficiently small for turning inputs intentionally created by the driver to be transmitted to the vehicle's steerable member.

(c) A dynamic resistance to turning movement away from center, the amount of dynamic resistance being variable in response to the rate of such turning movement.

(d) Relatively free return to the center position.

(e) A remotely operable trimming means to permit the driver to change the center position so as to compensate for changes in the level or direction of extraneous forces tending to cause spurious off-center movement of the vehicle.

(f) A fail-safe mode rendering the centering apparatus inoperative so that it in no way affects movement of the steering system if the vehicle's power steering unit has failed or is otherwise inoperative.

(g) For improved control and greater flexibility, the static return force, the static resistance and/or the dynamic resistance should be controllably variable, and means may optionally be provided for effecting such control.

By reason of the above, a principal object of the present invention is to automatically eliminate inputs to a vehicle steering system, except those intentionally created by the driver, and to thereby reduce considerably the driver inputs required to maintain a straight-ahead course for the vehicle. The present invention thus offsets spurious steering forces with an opposing force sufficient to keep the steerable wheels or other steerable members in a center position producing straight-ahead vehicular travel. The invention comprises a centering compensator having a center position corresponding to the center position of the steering system. The center position of the compensator is remotely adjustable to permit the driver of the vehicle to change and reset the center position of the steerable member to compensate for new or changed steering forces that would otherwise cause the vehicle to deviate from its straight-ahead course. Changes in the center position of the steering system may be necessitated by component wear or changes in the forces acting upon the vehicle, such as those caused by environmental conditions or by the conditions of the roadway. Even a change of tires can cause a change in the center position. Remote adjustment permits the center position maintained by the compensator to be changed during the course of vehicle operation from a location that is "remote" relative to the location at which the compensator is connected to the steering system of the vehicle.

Where installed on weak or soft steering systems, the invention provides the driver with a positive touch control not heretofore attainable. There is a distinctive feel for away from center steering movements at all turning positions, as well as for the center steering position. Thus, the sense of touch is added to the visual sense to aid control of the vehicle and reduce driver fatigue, and positive control for previously unstable steering systems is provided. The invention has all of the features listed above, namely, a variable return force to center sufficient to overcome spurious steering inputs; a larger variable resistance to steering movement away from center to provide steering feel; additional variable resistance to limit the rate of steering movement away from center; means for controllably varying the return force and off-center resistances; free return to center; trimming means for remote adjustment of the center position; and a fail-safe mode disabling the compensator when the vehicle's power steering unit is inoperative. As a further feature, the difference between the static resistance and the static return force is adjustable. This adjustment provides for different levels of steering force to make or "break away" into a steering movement away from center, whether initiated at the center position or at a prior turning position. Such movement is referred to hereafter as "turning movement". Different levels of break away force may be appropriate for different steering systems on the same or different types of vehicles. The invention is also capable of generating sufficient compensating forces to properly control and recenter offset wheels with oversized tires.

Although the present invention is particularly useful as a centering mechanism for motor vehicles, it can be employed to automatically position any steerable member movable to either side of a preselected position. For example, the compensator can keep an outboard motor centered so that the boat follows a straight course over the water in the presence of spurious steering forces produced by wind and wave action. The compensator can also be used to center such steerable members as the rudders of ships or airplanes and the tongues of tandem trailers or railway cars. The invention is usable with both powered and nonpowered steering systems, the level of compensating forces merely being less in compensators for vehicles without power steering.

The manner in which the present invention accomplishes the foregoing objectives and advantages will now be described. The centering unit of the compensator is connected between the steering system and the frame of the vehicle in a position that allows the steerable member to move through its full range of steering movements while always providing sufficient leverage for the compensator to return the member to the center position producing straightahead travel to the vehicle. The steering system connection may be made to any steering system component providing appropriate range and leverage, such as the tie rod which joins the front steerable wheels of a four-wheel vehicle. The frame connection may be made to any component serving as a fixed mounting relative to the steering system and this component may be a fixed axle or some other part carried by the vehicle frame instead of an actual frame member.

The compensator comprises two pressure chambers, both preferably in a single cylinder body and each containing an independently movable piston. Between the two pistons is an actuator component having a head for separately engaging either of the two pistons. The head is preferably carried on a centering rod passing axially through one of the pistons and one end of the cylinder body. However, other actuator arrangements can be used as discussed below. Either the cylinder or the actuator is connected to the frame. The other of these components is connected to the tie rod so that movement of the tie rod relative to the frame will cause the actuator to move one or the other of the pistons relative to the cylinder. Each piston is arranged to move from a fully retracted position corresponding to the center position of the compensator to a compressive position which decreases the size of its corresponding chamber and will thereby compress any fluid trapped therein.

Although a single fluid chamber similar to that shown in the Schwenk patent could be used in some applications, the operative length of such an arrangement is almost twice that of the present two chamber unit and is considered impractical for automotive applications. The excessive length of Schwenk is due to the dead space through which either follower 26 or 27 must move to accommodate movement of the opposing piston 29 or 28, respectively.

One piston chamber controls vehicle turning movement in one direction and the other piston chamber controls vehicle turning movement in the other direction. Hydraulic fluid is maintained in the respective piston chambers by a fluid system connected to each chamber through a corresponding port. The fluid system includes pressure control means comprised of a pressure accumulator for storing fluid energy and a differential pressure valve requiring a chamber pressure higher than accumulator pressure for piston movement away from center. The accumulator provides the return force for returning the pistons to the retracted, center position upon cessation of steering force. It also provides a base level of resistance force for constantly resisting compressive piston movement. The differential pressure valve establishes an additional level of resistance to compressive movement and a turning movement requires a steering force sufficient to overcome the total resistance to fluid flow represented by the accumulator and pressure valve combination. An orifice in series with the differential pressure valve limits the rate of piston movement away from center by further increasing the level of fluid resistance as the rate of flow through the valve increases after break away. Free return flow from the accumulator to the chambers upon cessation of steering force is provided by a line containing a check valve is parallel with the pressure valve and orifice.

One advantage of the present invention over the Quayle patent is that the system can be deactivated simply by dumping system pressure. In the preferred embodiment, several bypass lines are provided with valves for dumping system pressure under various conditions. It would be much more complicated, and probably impractical, to deactivate the Quayle system which is mechanically linked to a biasing spring.

In addition to compactness, another advantage of the invention over the Schwenk patent is the use of a liquid which is substantially incompressible compared to a gaseous fluid. A liquid is preferred to provide effective viscous dampening and precise control of centering piston movement in accordance with the rate of fluid flow. A compressible fluid also reduces the effectiveness of the pressure valve since significant piston movement can occur before the valve opens. Where a liquid is trapped in the centering chambers, the pressure valve provides substantially slack free centering since no significant piston movement can occur until this valve opens.

When the pressure valve is open, piston movement is controlled by the rate at which a liquid flows from the chambers to the accumulator. The level of steering force required to produce piston movement against the liquid is a function of the flow rate, the accumulator pressure and the pressure differential across the valve. The invention includes means for controllably varying each of those parameters. However, where the fluid is a gas, piston movement is also a function of fluid compressibility and control may not be adequate for many applications.

A particularly important feature of the invention is the provision of a remotely operable trimming means for controllably varying the center or other preselected position of the steerable member as maintained by the compensator. The remote trimming means is preferably comprised of a third chamber in the same cylinder body as the two centering chambers, this third chamber being a trimming chamber containing a trimming piston. The trimming piston is connected to one end of a trimming rod and, in the preferred embodiment, the other end of this rod serves as the connecting linkage between the cylinder and the vehicle frame. As the actuator serves as a fixed connecting linkage between the cylinder and the tie rod when the pistons are centered, movement of the trimming piston within its chamber changes the preselected position of the steerable member. Movement of the trimming piston within its chamber is produced by using fluid from the accumulator to create differential pressure in either direction across the piston. The direction and amount of differential pressure is controlled by inlet and outlet orifices of different sizes in series with solenoid stop valves. Again, a liquid fluid is preferred for its no slack locking capability.

BRIEF DESCRIPTION OF THE DRAWINGS

The invention, both as to its structure and operation, may be further understood by reference to the description below of the best modes taken in conjunction with the accompanying drawings in which.

BEST MODES FOR CARRYING OUT THE INVENTION

Figure 1:
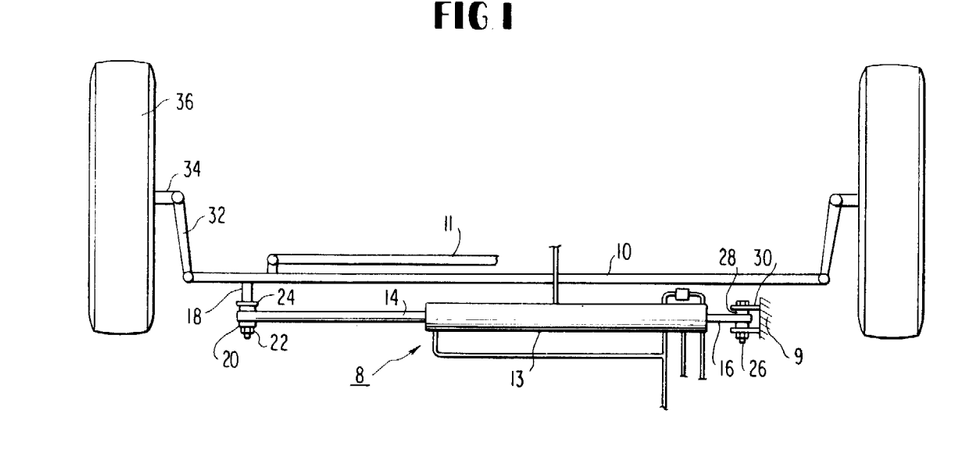
FIG. 1 is a schematic diagram of a steering system illustrating installation of the invention between the frame and steering system of a motor vehicle.

The steering compensator of the present invention comprises a centering unit, generally designated 8, which may be connected between the frame 9 and the tie rod 10 of a conventional motor vehicle as shown in FIG. 1 of the drawings. Steering inputs by the driver are transmitted to the tie rod through a steering rod 11. The compensator includes a centering cylinder 13 having a centering rod 14 extending from one end and a trimming rod 16 extending from the other end. The projecting end of the centering rod 14 is connected to the tie rod by means of a bracket 18 and a rubber biscuit 20 confined between nut 22 and washer 24. The projecting end of the trimming rod 16 is connected to the frame by means of a bolt 26 and a rubber biscuit 28 confined between the arms of a bracket 30. The brackets permit pivotal movement in the vertical plane and the biscuits permit more limited pivotal movement in the horizontal plane. As an alternative, the bolt and biscuit arrangement at the end of each rod can be replaced by conventional heim joints wherein an enlarged spherical rod end is held for pivotable movement within a surrounding journal structure carried by a bracket. The steering system components shown are conventional and include bell cranks 32—32 carried by knuckles 34—34 which support steerable wheels 36—36 for pivotable turning movement about kingpins (not shown) mounted on the vehicle frame.

The components of the compensator and the way in which they center and stabilize the vehicle steering system will now be described with reference to FIG. 2. It is to be understood that each of the components described are connected together by appropriately sized fluid conduits and that those conduits are represented by the lines interconnecting the components as shown. The inner end of centering rod 14 is comprised of an enlarged head 40 positioned between opposing faces of two centering pistons 42 and 44. The centering pistons are each shown in their retracted positions and are arranged for compressive movement toward the opposite ends of their respective chambers, piston 42 traveling in chamber 46 and piston 44 traveling in chamber 48 within a cylinder body 50. The retracted position of each piston is defined by an internal annular stop 52 which preferably has an axial width substantially equal to the axial thickness of rod head 40. If the width of the stop is greater than the head thickness, gaps between abutting surfaces allow unbiased movement (slack) between rod 14 and cylinder 50. If stop width is less than head thickness, similar slack results because fluid can flow back and forth between chambers 46 and 48 through line 53 and the pistons will move together until one of them bottoms out against the stop, there being no pressure differential across the rod head in the interim.

Near the end of each chamber opposite to the retracted piston is a single port for communicating fluid pressure to the chamber, port 54 serving chamber 46 and port 56 serving chamber 46. Ports 54 and 56 are connected via lines 58 and 60 to an accumulator 62 which provides hydraulic fluid under pressure to the centering chambers 46 and 48. The accumulator has a pressure chamber 64, an air chamber 66 separated from the pressure chamber by a movable accumulator piston 68, and a reservoir chamber 70 separated from the air chamber by a wall 72. Air chamber 66 is connected through a check valve 73 and a line 74 to a compressed air source 76. Valve 73 may be a Schraeder valve of the type used in the valve stems of pneumatic tires and line 74 may represent an air hose that can be disconnected after chamber 66 has been pressurized. Although valve 73 is optional and may be a pressure regulator valve or a stop valve instead of a check valve, some type of cut-off valve near port 77 is preferred to limit the volume of air compressible by piston 68. This allows hydraulic pressure in the centering chambers to be controllably varied over a relatively wide range because the air trapped in chamber 66 provides a spring-like return force which increases with compressive movement. The stroke of piston 68 within the accumulator should be long enough for pressure chamber 64 to receive the entire volume of fluid from either chamber 46 or 48 without the piston bottoming out against wall 72.

Reservoir 70 is vented either to atmosphere or to engine vacuum through a line 78 containing an air filter 80. Air pressure in chamber 66 acts through piston 68 to store fluid energy received from the hydraulic side of the system which is pressurized and kept full of hydraulic fluid by a pump 82. Pump 82 pumps fluid from reservoir 70 to line 60 through a check valve 84. Pump 82 is preferably electric and has a control mechanism 85 operable from the driver's station of the vehicle to vary the hydraulic system pressure. The pump control may be comprised of a manual switch in combination with a pressure gauge to indicate accumulator pressure. Alternately, the pump may be actuated automatically by a pressure regulator for maintaining a preselected system pressure. A selector switch is then provided to vary the pressure settings of the regulator. By varying the pressure, the break away resistance and return force produced by the accumulator can be increased as vehicle speed increases. The range of pressures available should be selected so that break away resistance can be varied from relatively soft at low speeds to relatively hard at high speeds. As another alternative, break away resistance can be varied directly in response to vehicle speed by using a variable speed pump and tying it to vehicle speed. Two such pumps are already available on motor vehicles, one in the automatic transmission and the other in the power steering system, and either of these could be used to power the steering compensator. A separate hydraulic pump driven by the power steering belt would serve the same function and have the advantage of automatically cutting off with the power steering system.

A bleed line 86 containing a normally closed cock 88 allows chamber 64 to be completely filled with hydraulic fluid. In this connection, line 86 may bleed back to reservoir 70. As an alternative, this line may be eliminated by arranging line 60 and the accumulator components so as to form an air trap venting back to the reservoir through pump 82.

The vehicle steering system is properly centered when pistons 42 and 44 abut stop 52. In order to move or break away from stop 52, these pistons must overcome the resistance provided by accumulator pressure acting through a return line 90 containing a check valve 92. An additional level of resistance to be overcome for turning movement is provided by a pressure differential valve 96 in a discharge line 98 containing an orifice 100. Until pressure in one of the centering chambers exceeds the setting of valve 96, movement of both pistons is prevented by fluid trapped in the centering chambers by this valve in line 98 and return check valve 92 in parallel line 90. When the pressure setting of the differential pressure valve is reached, fluid then flows through line 98 into accumulator chamber 64. Orifice 100 controls the rate of fluid flow out of the respective centering chambers when valve 96 is open. The orifice may be fixed or variable in size and in either case provides a flow resistance that varies in response to the rate of piston movement. A variable size orifice having a remotely controlled solenoid 101 may be provided to make the flow restriction also controllably variable in response to vehicle speed or a manual selector and may comprise a solenoid operated throttle valve or multiported valve with different size outlet orifices.

Valve 96 is preferably of the spring biased type and dotted line 102 represents a pilot line through which centering chamber pressure is applied until it overcomes the force of diaphragm spring 104 and opens the valve. The pressure setting of this valve can be varied by adjusting the spring tension, and the valve may include a remotely controlled solenoid 105 so that the pressure differential can be manually or automatically varied in accordance with vehicle speed.

The pressurized hydraulic fluid available from the accumulator is transmitted to the centering chambers through the return line 90. This accumulator energy provides the return force for reseating pistons 42 and 44 in their retracted positions upon removal of intentional steering inputs. Should the rate of piston return to center be too rapid and cause the steering system to overshoot its center position, an orifice may also be installed in line 90 to control the rate of fluid flow into the respective centering chambers. However, such flow restrictions should not prevent a relatively free return of all components to center.

Although accumulator pressure alone will resist off-center movement of the pistons in the absence of a pressure differential valve, it is preferable to use this valve so that the steering force required to make a turning movement away from center is substantially higher than the return force returning the system to center upon removal of the steering force. The preferred pressure parameters for using the compensator with a power steering system are a range from 50-150 psi in the accumulator and a differential pressure in the range of 200-300 psi for opening valve 96. The size of orifice 100 is preferably within the range of 0.03 to 0.06 inches.

Although pressure differential valve 96 is optional, the use of this valve is an important feature of the invention because it provides improved centering stability and steering control. This valve opens at its set point and remains open as long as a pressure differential above the set point exists between line 58 and line 60. It will therefore remain open while a centering piston is moving away from center and will close when such movement stops, flow through orifice 100 lowering the pressure differential below the set point. The steering force may vary within the range of resistance represented by valve 96 without generating any steering movement. Thereafter, when the steering force drops below the opposing return force generated by accumulator pressure, the off-center piston returns to its retracted position as fluid flows from the accumulator through check valve 92. Pressure valve 96 in combination with accumulator 62 therefore provides a static resistance force greater than the static force provided by the accumulator alone. The term "static" is used in this specification to distinguish the variable resistance provided by orifice 100 in response to the rate of fluid flow produced by movement of a center piston. By comparison, both means of static resistance may be present without fluid flow.

Centering cylinder 50 has a breather port 110 connected to a line 111 so that air can flow in and out of the space between the two centering pistons as those pistons move back and forth in their respective chambers. This port is preferably also arranged to drain off any fluid leaking past these pistons. Line 111 is preferably connected to engine vacuum to create positive suction for preventing any accumulation of fluid between the pistons. Various seals as shown in FIG. 2, preferably of the O-ring type, are employed to minimize such leakage.

A bypass line 120 is provided for depressurizing the hydraulic side of the system by dumping accumulator chamber 64 and centering chambers 46 and 48 to reservoir 70 which is vented through line 78. Bypass line 120 contains a pressure relief valve 122 to protect the system from overpressurization and a power steering safety valve 124 where the system is employed on a vehicle with a power steering unit. The relief valve is preferably set at 50-150 psi greater than the maximum system pressure required to open differential pressure valve 96, that pressure being the sum of accumulator pressure and the differential pressure setting. For an accumulator pressure of 150 psi and a differential pressure setting of 300 psi, the relief valve would be set in the range of 500-600 psi. The power steering safety valve is preferably a solenoid operated valve actuated by a switch for detecting flow or pressure in the recirculation line found on conventional power steering pumps. The valve is open when deactivated and is actuated to its closed position in response to fluid flow generated by pump operation. Thus, when the pump is not operating, whether due to engine shut-off, breakage of the drive belt or other power steering failure, the power steering safety valve remains open to dump centering cylinder pressure to the reservoir.

A manual on-off valve 126 and a speed sensitive valve 128 may also be optionally provided. The manual on-off valve is preferably a solenoid valve actuated by an on-off switch located at the driver station of the vehicle so that the driver can selectively activate the compensator. The speed sensitive valve is also preferably a solenoid valve and is actuated to its closed position by a switch operated in response to a vehicle speed detecting mechanism, such as conventional speed switches associated with the speedometer or transmission train of a motor vehicle. The speed sensitive valve may remain open at low speeds so that small radius turning maneuvers can be executed without centering resistance, and closed at speeds above about 25 to 30 miles per hour to provide centering compensation at highway speeds which involve only large radius turning maneuvers.

A particularly important feature of the invention is the provision of means to remotely "trim" the center position of the steerable member in order to compensate for changes in extraneous steering forces that would otherwise cause the vehicle to drift off of its straight ahead course unless opposed by the driver. Trimming is accomplished by controllably varying the overall length of the compensator as determined by the distance between its respective connections to the frame and to the steering system of the vehicle. A coupling of remotely variable length is used for this purpose and preferably comprises a trimming piston 130 carried on one end of trimming rod 16, the other end of rod 16 being connected to the frame of the vehicle as described above. Piston 130 reciprocates in a third chamber within cylinder body 50, this trimming chamber having a retraction portion 132 and an extension portion 134. Pressure from the accumulator is supplied to the retraction portion through a check valve 136 and an inlet orifice 138 and to the extension portion through a check valve 140 and an inlet orifice 142. Pressure is released or dumped from the trimming chamber to the reservoir chamber 70 through a line 144, the flow path from retraction portion 132 including line 146 containing a normally closed solenoid valve 148 and an outlet orifice 150 and the flow path from extension portion 134 including line 152 containing a normally closed solenoid valve 154 and an outlet orifice 156. Inlet orifices 138 and 142 are of a small cross-section, preferably 0.006 to 0.01 inches in diameter, while outlet orifices 150 and 156 are of much larger diameter, preferably 0.015 to 0.03 inches in diameter. Accordingly, the opening of one or the other of stop valves 148 and 154 produces a pressure differential approximately equal to accumulator pressure across the piston 130 causing it to extent or retract depending on which stop valve is opened. Outlet orifices 150 and 156 are preferably used to provide more positive control of the rate of movement of piston 130. Both inlet and outlet orifices are optional since the corresponding lines may be sized to provide appropriate flow resistance both upstream and downstream of the trimming chamber to adequately control movement of the trimming piston.

Figure 2:
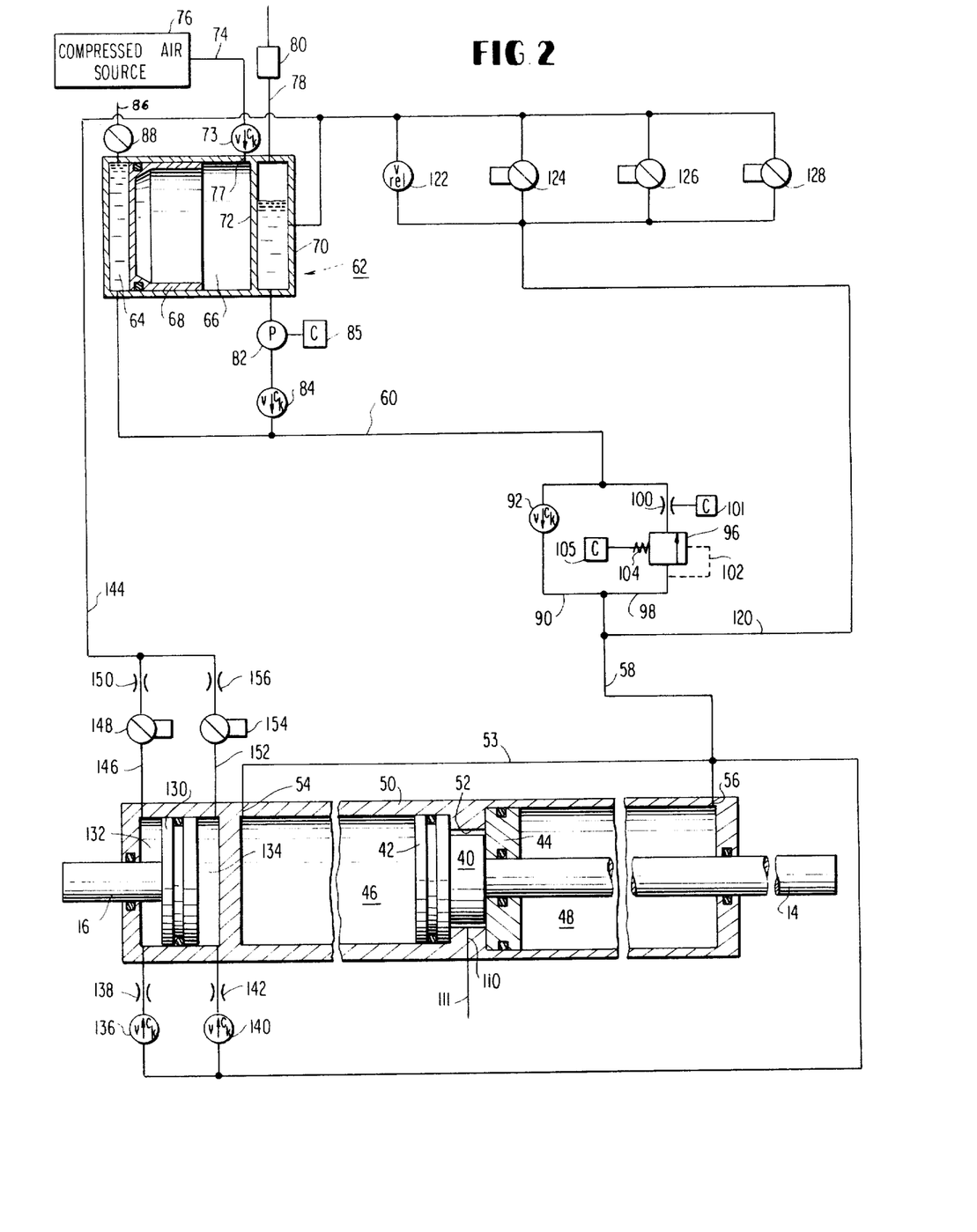
FIG. 2 is a schematic diagram of the fluid system and major components of the invention.
Figure 3:
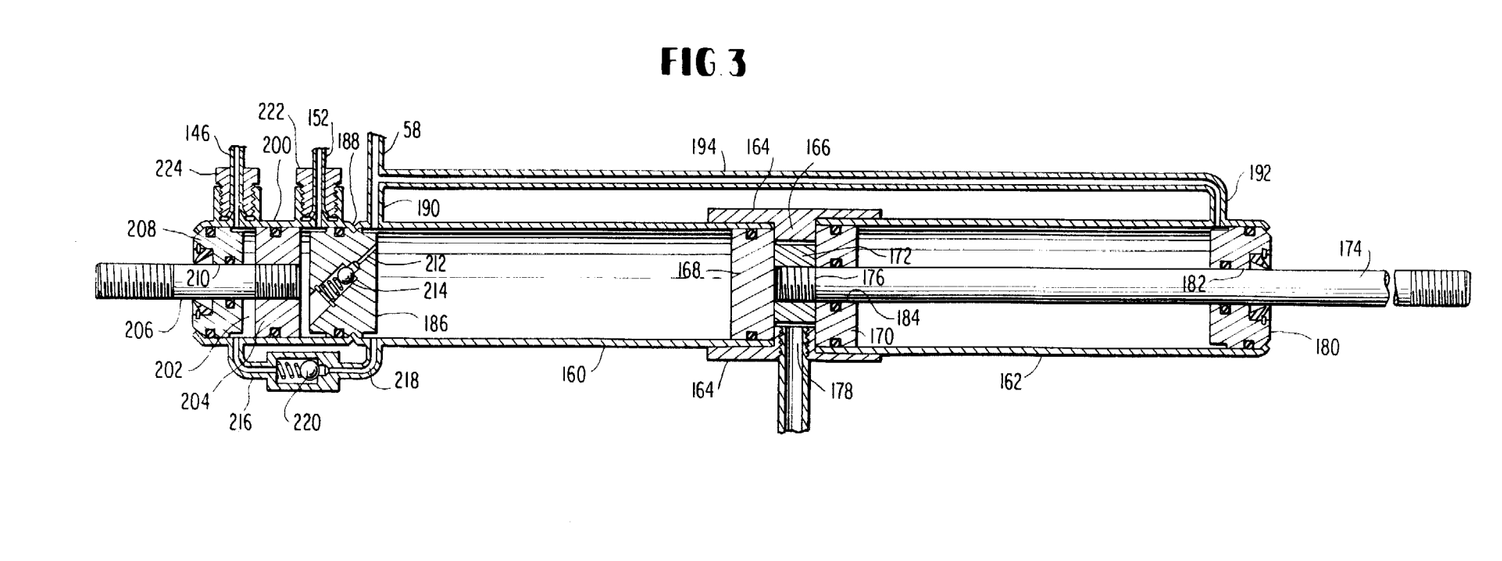
FIG. 3 is a sectional view showing structural details of the centering unit of the invention.

Referring to FIG. 3, there is shown a specific structural arrangement of the components preferably incorporated in or attached directly to the centering cylinder. In this embodiment, the cylinder body is comprised of two separate cylindrical wall sections 160 and 162, the adjacent ends of which are connected together by a collar 164. The collar includes an internal stop 166 and the cylinders contain centering pistons 168 and 170 as previously described. A rod head 172 serves as the actuator for pistons 168 and 170 and is attached to a centering rod 174 by threads 176. A drain port 178 is also carried by collar 164. The opposite end of cylinder section 162 is closed by a head 180 having a sealed aperture 182 for sliding passage of centering rod 174. Piston 170 has a sealed aperture 184 for sliding passage of rod 174 during its movement of piston 168. The opposite end of cylinder section 160 is closed by an intermediate head 186 to which the cylinder wall is secured by crimping as at 188. Cylinder sections 160 and 162 have fluid ports 190 and 192, respectively, and these ports are connected together by a conduit 194 which in turn is connected to the accumulator through the joint conduit 58 of FIG. 2. An important feature is the difference in relative diameters between sections 160 and 162, the diameter of section 162 being larger by an amount sufficient to produce equal centering forces on pistons 168 and 170 at the same chamber pressure. In other words, the cross-sectional area of cylinder 162 and the annular surface of piston 170 must be increased by the amount of piston area lost by reason of rod aperture 184.

Cylinder section 160 includes a cylindrical extension 200 beyond head 186 and this extension defines a trimming chamber 202 containing a trimming piston 204 threaded on one end of a trimming rod 206. Chamber 202 is closed at its inner end by the head 186 and at its outer end by an end head 208 similar to head 180 at the opposite end of section 162. The trimming rod passes through an aperture 210 in head 208. An inlet port to the extension portion of chamber 202 is provided by an orifice 212 and a spring-loaded ball check valve 214 in intermediate head 186. These components perform the functions of orifice 142 and check valve 140 in FIG. 2. An inlet port to the retraction portion of chamber 202 is formed by a conduit 216 extending from the centering chamber of section 160 and containing an orifice 218 and a spring-loaded ball check valve 220. Orifice 218 and valve 220 correspond to orifice 138 and check valve 136 in FIG. 2. Outlet ports for the extension and retraction portions of the trimming chamber are provided by threaded couplings 222 and 224 respectively, which secure conduits 146 and 152 of FIG. 2 to the wall of cylinder extension 200. The remaining components of FIG. 2 are preferably located remotely from the centering cylinder, such as in the engine remotely from the centering cylinder, such as in the engine compartment or under the dash of a motor vehicle or behind the steering panel of a boat, airplane or other steerable vehicle employing the invention.

The trimming components of the centering unit may be located between the centering pistons instead of at one end of the centering cylinder. This may result in a shorter centering unit by eliminating the need for a separate trimming rod and an intermediate head, such as head 186 in FIG. 3. One such embodiment of the invention is illustrated in FIGS. 4 and 5.

Figures 4, 5, 6:
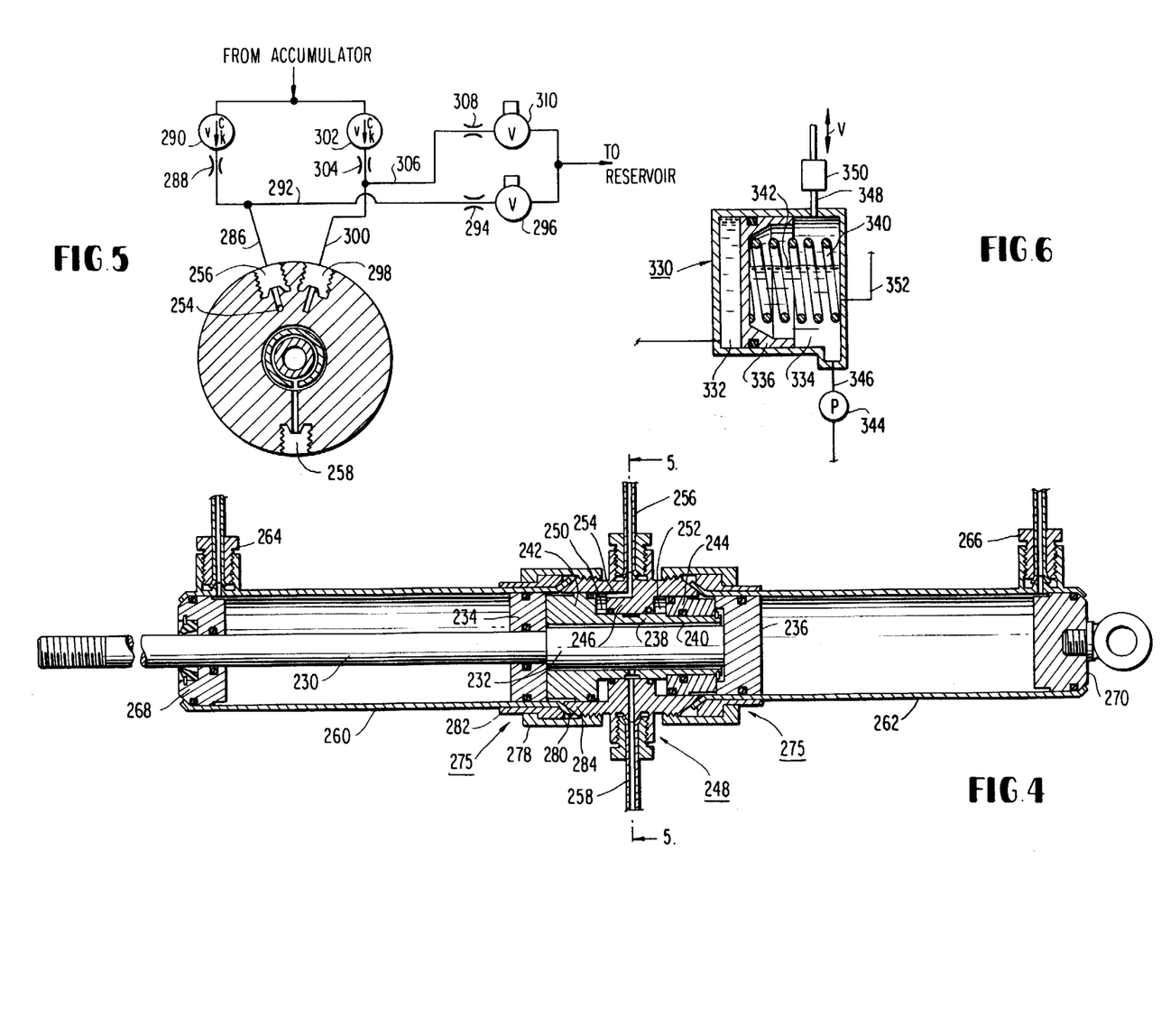
FIG. 4 is a sectional view of a modification of the centering unit of the invention.
FIG. 5 is a cross-sectional view of the modified centering unit along lines 5—5 of FIG. 4.
FIG. 6 is a sectional view of a modification of the pressure accumulator component of the invention.

With reference to FIG. 4, rod 230 serves as both a centering rod and a trimming rod. This rod is threaded to an actuator 232 positioned between centering pistons 234 and 236. Also between the two centering pistons is a trimming piston 238 having a bore 240 for receiving the actuator and two head portions 242 and 244, one on either side of an annular stop 246 projecting inward from a central collar 248. Head 242 defines an extension chamber 250 and head 244 defines a retraction chamber 252. Chamber 250 is connected to the fluid system through a bore 254 and a port 256. The collar 248 includes a breather port 258 and the diameter of actuator 232 is less than that of bore 240 by an amount sufficient to equalize pressure between the centering pistons and the port and prevent the accumulation of fluid. Appropriate seals of the O-ring type are provided on the trimming heads and on the annular stop to retain hydraulic fluid in the trimming chambers with the bore vented to the atmosphere or engine vacuum.

The modified centering unit further comprises separate cylinder sections 260 and 262, the outer ends of which have ports 264 and 266 and are closed by heads 268 and 270, respectively. The inner ends of the repective cylinders are connected to opposite sides of collar 248 by flared tube-type connections 275-275, each comprised of a coupling 278 for wedging a flared cylinder end 280 between cooperating surfaces on a sleeve 282 and adjacent collar end 284.

With reference to FIG. 5, trimming chamber 250 receives fluid under pressure from the accumulator via bore 254 and port 256 through a connecting line 286 containing a small orifice 288 and a check valve 290. Fluid pressure in chamber 250 can be dumped to the reservoir through a branch line 292 containing a large orifice 294 and a solenoid valve 296. Trimming chamber 252 has a corresponding bore running in the opposite direction (not shown), a port 298, a pressure line 300 containing a check valve 302 and a small orifice 304, and a pressure dump line 306 containing a large orifice 308 and a solenoid valve 310. In actual practice, the collar bores may be sized to serve the function of the large orifices 294 and 308. Due to the substantial difference in capacity between the small and large orifices, the opening of a solenoid valve depressurizes the corresponding trimming chamber. The orifices are sized and this trimming embodiment is operated in the same manner as those of FIG. 2. The description of those features appears above and need not be repeated here. However, in this embodiment, the direction of composite piston movement is away from the depressurized trimming chamber such that the retraction and extension chambers are reversed as compared to FIG. 2. This embodiment further illustrates that the cylinder end of the centering unit may be attached either to the tie rod or to the vehicle frame, with the centering rod attached to the other of those structures.

The accumulator and reservoir components may take almost any form capable of storing fluid energy and providing fluid under pressure to the chambers of the centering cylinder. One alternate design for the accumulator is shown in FIG. 6. In this embodiment, the accumulator body 330 contains a single chamber having a pressure side 332 and a reservoir side 334 on opposite sides of a movable piston 336. Static hydraulic pressure is generated by the force of a coil spring 340 which biases piston 336 toward the pressure side of the chamber. The volume behind the piston serves as a reservoir for make-up fluid 342 supplied to a hydraulic pump 344 by a line 346. The reservoir chamber has a vent line 348 with an air filter 350. Arrow "V" indicates that gas in the space above liquid 342 can surge in either direction through line 348 as liquid is pumped out of line 346 or dumped into a relief line 352.

As an alternative, a valve similar to valve 73 of FIG. 2 may be substituted for filter 350 so that a trapped air bias is combined with the spring bias. Among further alternatives possible is the replacement of spring 340 with a sealed air bag or some other type of diaphragm containing trapped air. Since these alternatives provide a sealed chamber on the air side of piston 336, a separate reservoir chamber, similar to chamber 70 in FIG. 2, should be used. As a further alternative, the centering cylinder fluid may be a gas, such as air, rather than a liquid. Thus, the invention would be operable if the compressed air source were connected directly to lines 60 and 144 with appropriate valves, orifices and seals substituted for the liquid equivalents shown. However, the incompressibility of a liquid is preferred as previously explained.

Operation of the compensator will now be described based on the steering system depicted in FIG. 1 and the manner in which the centering cylinder is mounted relative to that steering system. However, it is to be understood that the trimming rod and centering rod connections may be reversed, and that the invention can be used both with other tie rod arrangements and with steering systems that do not require tie rod linkages, such as those with only one steerable member.

Without the compensator of the present invention, spurious steering forces of relatively small magnitude can cause the vehicle steering system to move to one side or othe other of center or to oscillate back and forth, thereby producing corresponding movements of the vehicle away from the desired direction of vehicular travel. Such spurious inputs may be caused by road forces acting on the vehicle wheels, environmental forces acting on the vehicle body, driver forces acting on the steering wheel, inherent off-center bias in the steering system itself, or any combination of these forces. With the compensator installed as shown in FIGS. 1 and 2, these spurious inputs are opposed at all times by the static pressure resistance of the accumulator acting through check valve 92. An additional level of static pressure resistance relative to accumulator pressure is provided by differential pressure valve 96. Therefore, before either piston 42 or piston 44 will break away from its retracted position against stop 52, the steering force imposed on centering rod 14 by steering rod 11 must exceed this cumulative pressure resistance. The accumulator pressure and set point of valve 96 are such that the break-away force required to move the centering pistons can be readily exceeded by intentional steering inputs but will not be exceeded by the usual spurious steering forces.

Assuming that the centering unit 8 is toward the front end of the vehicle in FIG. 1, the centering rod 14 is pushed inward against piston 42 by turns to the left and pulled outward against piston 44 by turns to the right. Since the operating principals of these pistons are the same, movement of only one will be described. During an intentional turn of the vehicle to the right, centering rod 14 is pulled outward with sufficient force to open differential valve 96 and cause hydraulic fluid to flow through orifice 100 and into accumulator chamber 62. This fluid flow permits piston 44 to move away from its retracted position in a compressive stroke that causes accumulator piston 68 to move toward wall 72 against the force of compressed air in chamber 66. When the steering force falls below the combined resistance of the pressure valve and the accumulator, piston movement stops and differential valve 96 closes. Thereafter, when the steering force falls below the biasing force acting on accumulator piston 68, as upon release of the steering wheel, accumulator pressure acting through check valve 92 forces piston 44 back into its retracted position. This returns piston rod 14 and the steerable wheels interconnected therewith to their straight-ahead positions. Piston 42 remains in its retracted position during movement of piston 44. During a turn to the left, piston 42 moves and the piston 44 remains in its retracted position.

Discharge orifice 100 imposes a limit on the rate of steering movement away from center to prevent changes in direction at rates sufficient to upset the vehicle. Orifice 100 does not interfere with normal turning movements but is sized to provide blowout protection by resisting abnormally rapid movements. A return orifice may also be provided if needed to control the rate of free return to center. An overly rapid return movement combined with a relatively low differential pressure range could cause a heavy steering system to overshoot its center position upon release of the steering wheel.

If the driver is not satisfied with the trim of the compensator because the vehicle drifts to one side or the other upon release of the steering wheel, the trim is adjusted to the position producing straight-ahead travel. This is accomplished remotely by the driver who actuates the appropriate solenoid valve to change the overall length of the compensator. In the embodiment of FIGS. 1 and 2, the wheels 36-36 are trimmed toward the right side of the vehicle by opening valve 148 to extend rod 16. A trim toward the left is produced by opening valve 154. When the desired course correction has been achieved, the opened valve is closed. Valve closure traps fluid on either side of piston 130 and thereby locks it in position relative to cylinder 50. Because of the flow restriction imposed by the smaller trimming orifices 138 and 142, the flow of fluid allowing movement of piston 130 is relatively small and trimming corrections take place at a sufficiently slow rate to be accurately controlled by the driver. It is preferable to have a trim control that also provides for opening both solenoid valves simultaneously to permit trimming with the steering system of the vehicle as distinguished from trimming with accumulator pressure. In this trimming mode, the steering member is held in the position giving straight-ahead travel while pressure is equalized across the trimming piston by opening both valves. The valves are then closed simultaneously to lock the trimming piston to the cylinder.

Operation of the alternate trimming embodiment in FIGS. 4 and 5 is basically the same. Valve 296 is opened to retract rod 230 and valve 310 is opened to extend this rod, thereby varying the overall length of the centered unit. Opening both valves simultaneously allows trimming with the steering system.

As previously described, the compensator is completely deactivated by manual opening of valve 126 or automatic opening of speed sensitive valve 128, pressure relief valve 122, or power steering safety valve 124. When any of these valves are open, pressure in the accumulator and in other parts of the fluid system is dumped to the vented reservoir. Without pressure in the fluid system, movement of the centering rod in response to vehicle steering will move each of the centering pistons away from the central stop and those pistons will remain at their point of furthest movement until the fluid system is repressurized. Engine vacuum is applied through the breather port is not sufficient for return movement of the pistons. Vacuum is applied only for purposes of keeping the volume between the pistons free of such fluid as might otherwise accumulate from leakage past the various seals. When all of the dump valves are closed, the fluid system is again pressurized by actuation of pump 82. Pump actuation may be manual or automatic as previously described. If automatic, an interlock is preferably used to deactivate the pump when any of the dump valves are open. This ensures that the pump will not produce any pressure in the centering chambers while the system is deactivated. As an alternative to pressure actuation, the pump may be actuated automatically by the position of piston 68 in the accumulator. As a further alternative, a constant head pump can be utilized for pressurizing the hydraulic system and the accumulator may be omitted. However, the accumulator arrangement is preferred for its response to pressure transients within the system.

INDUSTRIAL APPLICABILITY

As illustrated in the foregoing description, the invention is especially applicable to motor vehicles having power steering systems. The invention also has a wide range of other industrial applications and can be utilized to automatically center any device having a steered member interconnected by suitable linkages to a steerable member. For example, the invention is capable of providing centering compensation for the steering systems of a wide variety of vehicles, including automobiles, trucks, motorcycles and other on the highway and off the highway motor vehicles, small boats and large ships, and aircraft.

The compensator can be modified in a number of respects as already indicated above and these and other modifications are contemplated by the invention. By way of further example, the actuator head could be carried by components other than a piston rod and caused to rotate rather than reciprocate. Thus, a cam-like head could be mounted for rotation on a transverse shaft which in turn could be rotatably driven in response to steering system movement by appropriate linkages. Similarly, each of the centering pistons could be carried in separate cylinders which need not be in axial alignment.

The centering components can be used alone as a centering mechanism without a remote trimming feature. Fixed trimming adjustments (non-remote) could be accomplished by installing a threaded coupling of adjustable length between either the centering cylinder or the centering rod and the vehicle. Furthermore, the liquid flow resistance features of the invention, such as those provided by valve 96 and orifice 100, can be used in combination with prior art return systems of the spring-loaded or pneumatically biased type.

The remote trimming feature of the invention is usable not only with the compensator disclosed here, but also in combination with centering mechanisms of the prior art, such as those disclosed in U.S. Pat. Nos. 3,056,461 and 3,583,515, the contents of which are expressly incorporated herein by reference. Thus, the remotely operable trimming components can be combined with spring-loaded centering devices or pneumatic centering devices of known types and provided with an independent fluid system for selectively applying differential trimming pressure across the trimming piston. In addition, the trimming pressure differential may be provided pneumatically instead of hydraulically.

A number of modifications to the trimming components themselves are possible without departing from the scope of the invention. For example, the trimming rod could be welded to the body of the centering cylinder and have a helical screw portion arranged externally to the cylinder for engagement by an electrical screw drive mechanism operable from a remote location. The screw drive mechanism would be mounted on the vehicle frame and provide adjustments in the distance between the frame and the cylinder. As another alternative, the trimming cylinder could be replaced by the coil of a double-acting solenoid and the trimming piston replaced by the solenoid plunger. A fluid dampening component could be added to the plunger for controlling the rate of its movement within the coil. All of these alternatives would be remotely operable by electrical switches at the steering station of the vehicle.

What is claimed is:

1. An apparatus for returning to a preselected position the steering system of a vehicle having at least one steerable member movable to either side of said preselected position in response to a steering force, said apparatus comprising:

return means for providing a return force continuously biasing said steerable member toward said preselected position upon movement of said steerable member to either side of said preselected position; and, resistance means for preventing substantial movement of said steerable member to either side of said preselected position until said steering force exceeds said return force by an amount of differential force opposing said movement, said resistance means including actuator means for providing a fluid pressure differential in response to said movement and fluid means for resisting fluid flow in response to said fluid pressure differential so as to provide said amount of differential force.

2. The apparatus of claim 1 in which said fluid means includes accumulator means for providing fluid pressure to resist said fluid flow.

3. The apparatus of claim 2 in which said accumulator means includes means for controllably varying said fluid pressure.

4. The apparatus of claim 2 in which said fluid means further includes reservoir means for supplying fluid to said accumulator means.

5. The apparatus of claim 4 in which said reservoir means includes pump means for maintaining the fluid pressure provided by said accumulator means.

6. The apparatus of claim 5 in which the pressure maintained by said pump means is controllably variable.

7. The apparatus of claim 1 in which said fluid means includes flow restriction means for restricting said fluid flow.

8. The apparatus of claim 7 in which said flow restriction means includes valve means for preventing said fluid flow until said actuator means produces fluid pressure above a preselected amount.

9. The apparatus of claim 8 in which said valve means includes means for controllably varying said preselected pressure.

10. The apparatus of claim 7 in which said flow restriction means includes means for restricting the rate of said fluid flow in response to the rate of movement of said steerable member.

11. The apparatus of claim 10 in which said flow restriction means comprises an orifice in a conduit.

12. The apparatus of claim 7 in which said flow restriction means includes means for controllably varying the rate of said fluid flow.

13. The apparatus of claim 1 in which said fluid means includes means for controllably varying said resistance to fluid flow.

14. The apparatus of claim 13 in which said fluid flow resistance is controllably varied in response to the speed of said vehicle.

15. The apparatus of claim 1 in which said fluid means includes means for controllably preventing said resistance to fluid flow.

16. The apparatus of claim 1 in which said actuator means includes means for returning said steerable member to said preselected position in response to fluid pressure.

17. The apparatus of claim 16 in which said return means further includes accumulator means for supplying fluid under pressure to said actuator means.

18. The apparatus of claim 17 in which said accumulator means includes means for pressurizing said fluid in response to movement of said steerable member.

19. The apparatus of claim 17 in which said accumulator means includes means for providing pneumatic pressure to pressurize the fluid supplied to said actuator means.

20. The apparatus of claim 17 in which said accumulator means includes means for providing spring force to pressurize the fluid supplied to said actuator means.

21. The apparatus of claim 17 in which said accumulator means includes means for providing both spring force and pneumatic pressure to pressurize the fluid supplied to said actuator means.

22. The apparatus of claim 16 in which said return means further includes pump means providing fluid under pressure to said actuator means.

23. The apparatus of claim 22 in which said pump means includes means for controllably varying the pressure of said fluid.

24. The apparatus of claim 22 in which said pump means includes a variable speed pump.

25. The apparatus of claim 24 in which the speed of said pump is varied in response to the speed of said vehicle.

26. An apparatus for returning to a preselected position the steering system of a vehicle having at least one steerable member movable to either side of said preselected position in response to a steering force, said apparatus comprising:
cylinder means;
a first piston cooperating with said cylinder means to define a first chamber;
a second piston cooperating with said cylinder means to define a second chamber, each of said first and second pistons being arranged to move independently of the other between a retracted position and a position for compressing a fluid within its corresponding chamber;
an actuator arranged for movement to either side of a neutral position and having means for engaging each of said pistons independently of the other so that movement of said actuator away from said neutral position to one side causes compressive movement of said first piston without moving said second piston and movement of said actuator away from said neutral position to the other side causes compressive movement of said second piston without moving said first piston;
connecting means for connecting said actuator to said steerable member for movement therewith; and,
fluid means for providing fluid pressure in said first and second chambers so that said fluid pressure opposes movement of said steerable member toward either side of said preselected position and provides a return force continuously biasing said steerable member toward said preselected position during movement of said steerable member to either side of said preselected position.

27. The apparatus of claim 26 for a vehicle having a power steering unit for providing steering power to said steerable member, said apparatus further including means for preventing pressurization of said first and second chambers in the absence of steering power from said power steering unit.

28. The apparatus of claim 26 which further includes means for preventing pressurization of said first and second chambers until a preselected speed has been attained by said vehicle.

29. The apparatus of claim 26 in which said fluid means includes means for controlling the rate of compressive movement of said first and second pistons.

30. The apparatus of claim 26 in which each of said pistons resist movement away from said neutral position with approximately the same force.

31. The apparatus of claim 26 in which said return means includes accumulator means for providing a fluid under pressure to said first and second chambers, and said pistons cooperate with said engaging means to bias said actuator toward said neutral position in response to the pressure of said fluid.

32. The apparatus of claim 31 in which said accumulator means provides fluid to each of said first and second chambers at substantially the same pressure.

33. The apparatus of claim 31 in which said fluid means includes differential pressure means for preventing substantial movement of said actuator until the pressure in at least one of said chambers substantially exceeds the pressure of fluid provided by said accumulator means.

34. The apparatus of claim 31 in which said accumulator means includes means for pressurizing said fluid in response to movement of said actuator.

35. The apparatus of claim 31 in which said accumulator means includes means for pressurizing said fluid with pneumatic pressure.

36. The apparatus of claim 31 in which said accumulator means includes means for pressurizing said fluid with spring force.

37. The apparatus of claim 31 in which said fluid means further includes reservoir means for supplying fluid to said accumulator means.

38. The apparatus of claim 31 in which said fluid means further includes pump means for pressurizing the fluid provided by said accumulator means.

39. An apparatus for returning to a preselected position a steering system having at least one steerable member mounted on a frame for movement to either side of said preselected position, said apparatus comprising:
  bias means for providing a return force biasing said steerable member toward said preselected position upon movement of said steerable member to either side of said preselected position, said bias means including linkage means for connecting said bias means to said frame at a first point of connection and for connecting said bias means to said steering system at a second point of connection in spaced relation to said first point of connection, said spaced relation defining a centered distance when said steerable member is in said preselected position; and,
  trim means for varying the preselected position of said steerable member, said trim means including a first member and a second member each forming at least a portion of said linkage means and being movable relative to each other to vary said centered distance, and drive means for causing said first and second members to move relative to each other so as to controllably vary said centered distance.

40. The apparatus of claim 39 which further includes activating means for causing said bias means to provide said return force at selected times and control means for selectively actuating said activating means from a location remote from said bias means so as to cause said bias means to provide said return force.

41. The apparatus of claim 40 in which said bias means further includes piston means for providing said return force in response to fluid pressure in a pressure chamber, and in which said activating means includes means for providing fluid pressure in said pressure chamber at selected times.

42. The apparatus of claim 39 in which said bias means further includes piston means for providing said return force in response to fluid pressure in a pressure chamber and means for pressurizing a fluid in said pressure chamber.

43. The apparatus of claim 42 in which at least a portion of said fluid is a gas such as air.

44. The apparatus of claim 42 in which at least a portion of said fluid is a liquid.

45. The apparatus of claim 39 in which said bias means further includes spring means for providing at least a portion of said return force.

46. The trimming apparatus of claim 39 in which one of said first and second members comprises a pressure chamber and the other of said first and second members comprises a piston movable in said chamber to controllably vary said preselected position.

47. The trimming apparatus of claim 46 in which said drive means comprises fluid means for providing a pressure differential across said piston to move said piston relative to said cylinder.

48. The trimming apparatus of claim 47 in which said fluid means includes control means for controlling the direction of said pressure differential across said piston.

49. The trimming apparatus of claim 47 in which said fluid means includes control means for controlling the rate of said piston movement relative to said cylinder.

50. The apparatus of claim 39 in which said actuator means further includes control means for operating said drive means from a location remote to said drive means linkage.

51. An apparatus for returning to a preselected position a steerable member movable to either side of said preselected position in response to a steering force, said apparatus comprising:
  return means for providing a return force biasing said steerable member toward said preselected position; and,
  resistance means including a fluid chamber, means for pressurizing a liquid in said fluid chamber in response to said steering force and means for preventing substantial movement of said steerable member to either side of said preselected position until the steering force pressurizing said liquid exceeds said return force by a preselected amount.

52. The apparatus of claim 51 in which said resistance means includes means for controllably varying said preselected differential force.

53. The apparatus of claim 51 in which said resistance means includes fluid means for causing said liquid to flow in response to movement of said steerable member away from said preselected position and for controlling said movement by controlling said liquid flow.

54. An apparatus for resisting movement of at least one steerable member movable to either side of a preselected position in response to a steering force, said apparatus comprising:
  cylinder means;
  a first piston cooperating with said cylinder means to define a first chamber;
  a second piston cooperating with said cylinder means to define a second chamber, each of said first and second pistons being arranged to move independently of the other between a retracted position and a position for compressing a fluid within its corresponding chamber;
  an actuator arranged for movement to either side of a neutral position and having means for engaging each of said pistons independently of the other so that movement of said actuator away from said neutral position to one side causes compressive movement of said first piston without moving said second piston and movement of said actuator away from said neutral position to the other side causes compressive movement of said second piston without moving said first piston;

connecting means for connecting said actuator to said steerable member for movement therewith; and, fluid means for providing fluid pressure in said first and second chambers so that said fluid pressure opposes movement of said steerable member toward either side of said preselected position.

55. The apparatus of claim 54 in which said apparatus further includes return means for biasing said steerable member toward said preselected position when said member has moved to either side of said preselected position.

56. The apparatus of claim 55 in which said apparatus further includes:

trimming means operable to vary the preselected position of said steerable member; and actuator means for operating said trimming means to controllably vary said preselected position from a location remote to said trimming means.

57. The apparatus of claim 56 for a steerable member supported for steering movement on a frame means, and in which:

said return means includes a connecting linkage between said steerable member and said frame means, the length of said linkage defining said preselected position;

said trimming means includes a first member and a second member each forming at least a portion of said connecting linkage and being movable relative to the other to change the length of said connecting linkage; and, said actuator means includes drive means for moving said first and second members relative to each other so as to controllably vary said preselected position.

58. An apparatus for resisting movement of at least one steerable member movable to either side of a preselected position in response to a steering force, said apparatus comprising:

actuator means for causing a fluid to flow between a pressure chamber and an accumulator means in response to movement of said at least one steerable member to either side of said preselected position;

resistance means providing a first flow path for said fluid from said pressure chamber to said accumulator means, said first flow path including fluid resistance opposing movement of said at least one steerable member to either side of said preselected position; and, return means providing a second flow path for said fluid bypassing said fluid resistance and providing free flow from said accumulator means to said pressure chamber during return of said at least one steerable member toward said preselected position from a position to either side of said preselected position.

59. The apparatus of claim 58 in which said actuator means includes means for pressurizing said fluid in said pressure chamber in response to said steering force, and said resistance means includes means for preventing substantial movement of said at least one steerable member to either side of said preselected position until the pressure of said fluid in said pressure chamber exceeds the pressure of said fluid in said accumulator means by a predetermined amount.

60. The apparatus of claim 59 in which said resistance means further includes means for controllably varying said predetermined pressure differential during operation of said vehicle.

61. An apparatus for returning to a preselected position at least one steerable member mounted on a frame of a vehicle for movement to either side of said preselected position, said apparatus comprising:

return means for providing a return force biasing said steerable member towards said preselected position upon movement of said steerable member to either side of said preselected position, said return means including a centering member movable with said steerable member and having a centered position relative to said vehicle frame corresponding to the preselected position of said steerable member; and, trim means for controllably varying the preselected position of said steerable member while said vehicle is in operation, said trim means comprising drive means for providing trimming movement of said centering member so as to change said centered position relative to said vehicle frame and control means for selectively actuating said drive means from a location remote to said drive means such as a driver's station of said vehicle so as to cause said drive means to provide said trimming movement.

62. The apparatus of claim 61 for a vehicle having steering means for providing steering movement of said at least one steerable member, and in which said drive means comprises means for providing said trimming movement in response to steering movement of said at least one steerable member.

63. The apparatus of claim 61 which further includes activating means for causing said return means to provide said return force at selected times during operation of said vehicle.

64. The apparatus of claim 63 in which said return means further includes piston means for providing said return force in response to fluid pressure in a pressure chamber, and in which said activating means includes means for selectively providing fluid pressure in said pressure chamber.

65. The apparatus of claim 63 in which said control means includes means for selectively actuating said activating means while said vehicle is in operation from a location remote to said return means such as a driver's station of said vehicle so as to cause said return means to provide said return force.

66. The apparatus of claim 65 in which said activating means includes means for varying the amount of return force provided by said return means, and in which said control means includes means for selectively actuating said activating means so as to controllably vary the amount of return force provided by said return means.

67. The apparatus of claim 61 in which said return means further includes piston means for providing said return force in response to fluid pressure in a pressure chamber and fluid means for providing a fluid in said pressure chamber, and in which said control means includes means for selectively varying the pressure of said fluid.

68. An apparatus for positioning at least one steerable member supported on a frame means for movement to either side of a preselected position, said apparatus comprising:

bias means for providing a return force biasing said steerable member toward said preselected position upon movement of said steerable member to either side of said preselected position, said bias means including a connecting linkage for connecting said steerable member to said frame means such that the length of said linkage defines said preselected position of said steerable member; and, trim means for changing said preselected position of said steerable member, said trim means including a first member and a second member forming at least a portion of said linkage and being movable relative to each other to change the length of said linkage, and drive means for causing said first and second members to move relative to each other so as to change the length of said linkage.

69. An apparatus for returning to a preselected position the steering system of a vehicle having at least one steerable member movable to either side of said preselected position in response to a steering force, said apparatus comprising:

return means for providing a return force continuously biasing said steerable member toward said preselected position upon movement of said steerable member through a predetermined distance to either side of said preselected position, said return force opposing movement of said steerable member away from said preselected position; and, trimming means for adjusting the preselected position of said steerable member, said trimming means including trim actuator means operable to controllably vary the preselected position of said steerable member and control means for operating said trim actuator means from a location remote from said trim actuator means.

70. An apparatus for returning to a preselected position a steering system having at least one steerable member mounted on a frame for movement to either side of said preselected position, said apparatus comprising:

bias means for providing a return force biasing said steerable member toward said preselected position upon movement of said steerable member to either side of said preselected position, said bias means including linkage means for connecting said bias means to said frame means at a first point of connection and for connecting said bias means to said steering system at a second point of connection in spaced relation to said first point of connection, said spaced relation defining a centered distance when said steerable member is in said preselected position; and, trim means for varying the preselected position of said steerable member, said trim means including drive means for causing said linkage means to vary said centered distance and control means for selectively actuating said drive means so as to controllably vary said centered distance and the corresponding preselected position of said steerable member from a location remote from said drive means.

71. An apparatus for returning to a preselected position the steering system of a vehicle having at least one steerable member movable to either side of said preselected positon in response to a steering force, said apparatus comprising:

return means for providing a return force continuously biasing said steerable member toward said preselected position upon movement of said steerable member to either side of said preselected position;

trim means operable for varying said preselected position of said steerable member, and, actuator means for operating said trim means to controllably vary said preselected position of said steerable member from a location remote from said trim means and said steerable member.

72. The apparatus of claim 71 in which said trim means includes means for causing trimming movement of said steerable member in response to at least one remote input, and said actuator means includes means for selectively providing said at least one remote input from a remote location such as a driver's station of said vehicle so as to change said preselected position while said vehicle is in operation.

73. The apparatus of claim 72 which further includes activating means for causing said return means to provide said return force at selected times while said vehicle is in operation.

74. The apparatus of claim 73 in which said activating means includes means for varying the amount of return force provided by said return means and control means for selectively actuating said activating means so as to controllably vary the amount of return force provided by said return means.

75. The apparatus of claim 74 in which said control means includes means for remotely actuating said activating means from a location remote to said return means such as a driver's station of said vehicle so as to controllably vary the amount of said return force while said vehicle is in operation.

76. The apparatus of claim 75 in which said return means further includes piston means for providing said return force in response to fluid pressure in a pressure chamber, and in which said activating means includes means for controllably varying the amount of fluid pressure in said pressure chamber.

77. The apparatus of claim 71 in which said return force opposes movement of said steerable member away from said preselected position.

78. The apparatus of claim 77 which further includes resistance means for providing a resistance force comprised of said return forces and a differential force in addition to said return force, said resistance means preventing substantial movement of said steerable member away from said preselected position until said steering force exceeds both said return force and said differential force.

79. The apparatus of claim 78 in which said resistance means further includes means for controllably varying the amount of said differential force.

80. The apparatus of claim 78 in which said resistance means includes means for controllably varying said resistance force.

81. The apparatus of claim 77 in which said return means includes means for controllably varying said return force.

82. The apparatus of claim 77 which further includes means for preventing said return force until a preselected speed has been attained by said vehicle.

83. The apparatus of claim 77 for a vehicle having a power steering unit for providing steering power to said steerable member, said apparatus further including means for preventing said return force in the absence of steering power from said power steering unit.

84. The apparatus of claim 71 in which at least a portion of said return force is provided by pneumatic pressure.

85. The apparatus of claim 71 in which at least a portion of said return force is provided by spring force.

* * * * *